(12) United States Patent
Peyrotte et al.

(10) Patent No.: US 8,952,847 B2
(45) Date of Patent: Feb. 10, 2015

(54) SYSTEM OF GEOGRAPHICAL LOCATION OF A RADIO SIGNAL TRANSMITTER LOCATED ON THE EARTH'S SURFACE, AND ASSOCIATED METHOD OF DISTRIBUTED INTERFEROMETRY

(75) Inventors: Christian Peyrotte, Toulouse (FR); Francis Martinerie, Labarthe sur Leze (FR); Jean-Baptiste Thevenet, Toulouse (FR)

(73) Assignee: Thales, Neuilly-sur-Seine (FR)

( * ) Notice: Subject to any disclaimer, the term of this patent is extended or adjusted under 35 U.S.C. 154(b) by 337 days.

(21) Appl. No.: 13/485,908

(22) Filed: May 31, 2012

(65) Prior Publication Data
US 2013/0141282 A1 Jun. 6, 2013

(30) Foreign Application Priority Data
Jun. 1, 2011 (FR) ..................................... 11 01682

(51) Int. Cl.
*G01S 5/02* (2010.01)
*B64G 1/10* (2006.01)
*G01S 5/06* (2006.01)

(52) U.S. Cl.
CPC ................. *G01S 5/02* (2013.01); *B64G 1/1085* (2013.01); *G01S 5/06* (2013.01)
USPC ....................................................... 342/424

(58) Field of Classification Search
USPC .................................. 342/424, 437, 450, 445
See application file for complete search history.

(56) References Cited

U.S. PATENT DOCUMENTS 5,914,687 A * 6/1999 Rose .............................. 342/442
6,072,433 A 6/2000 Young et al.
2009/0101793 A1* 4/2009 Leyre et al. ................. 250/203.6

OTHER PUBLICATIONS

J. Yao et al.: "The Associated Modeling and Precision Analysis of Spatial States and the Inter-Satellite Baseline of Formation Flying Satellites," Geoscience and Remote Sensing Symposium, 2006. IGARSS 2006. IEEE International Conference on, IEEE, PI, Jul. 1, 2006, pp. 1255-1258.
R. Sanchez et al.: "Design of a micro-satellite for precise formation flying demonstration," Acta Astronautica, Pergamon Press, Elmsford, GB, vol. 59, No. 8-11, Oct. 1, 2006, pp. 862-872.
W.D. Deininger et al.: "Formation Flying Activities and Capabilities at Ball Aerospace," Aerospace Conference, 2003. Proceedings. 2003 IEEE Mar. 8-15, 2003, Piscataway, NJ, USA, IEEE, vol. 6, Mar. 8, 2003, pp. 6 2599-6 2614.
Search Report issued in corresponding French application No. 1101682 on Jan. 19, 2012.

* cited by examiner

*Primary Examiner* — Harry Liu
(74) *Attorney, Agent, or Firm* — Baker & Hostetler LLP

(57) ABSTRACT

A system of geographical location of at least one radio signal transmitter located on the Earth's surface including: a set of satellites equipped with receiving antennas adapted for receiving said signals, forming a main extended interferometry device; an intersatellite relative metrology device for determining the relative positions of said satellites to one another, including at least one dedicated sensor for each satellite, and intersatellite communication means; a device for dating said received signals from said determining of the relative positions of said satellites to one another, issued by said intersatellite relative metrology device; a secondary interferometry device including at least one set of at least three antennas of a satellite; a ground base station; a device for transmitting measurements acquired on the satellites to the ground base station; and means of determining an absolute position of at least one of the satellites.

12 Claims, 2 Drawing Sheets

SYSTEM OF GEOGRAPHICAL LOCATION OF A RADIO SIGNAL TRANSMITTER LOCATED ON THE EARTH'S SURFACE, AND ASSOCIATED METHOD OF DISTRIBUTED INTERFEROMETRY

CROSS-REFERENCE TO RELATED APPLICATIONS

This application claims priority to foreign French patent application No. FR 11 01682, filed on Jun. 1, 2011, the disclosure of which is incorporated by reference in its entirety.

FIELD OF THE DISCLOSED SUBJECT MATTER

The present invention relates to a system of geographical location of at least one radio signal transmitter located on the Earth's surface, and an associated method of distributed interferometry.

BACKGROUND

Systems of geographical location or geolocation of at least one radio signal transmitter located on the Earth's surface using a set of satellites equipped with GPS (acronym for "Global Positioning System" by satellite) receivers are known. The AIS "Automatic Identification System" program and the ORBCOM system can be cited as examples.

Such systems of geographical location of radio signal transmitters located on the Earth's surface are frequently dependent on an external system, the GPS system. Thus, in case of failure of the GPS system, or inaccuracies, or refusal to share data by their owner, such a system of geographical location, which depends on it, would then be inoperative or of greatly increased inaccuracy.

Such systems are limited in accuracy of location when the spatial segment of the system is limited to a single satellite since the antenna-base formed does not generally exceed about ten meters.

Such systems are limited in detection and tracking ability when the system is distributed over several satellites because of the difficulty in synchronizing and exchanging data between satellites. Location is performed a posteriori, on the ground.

SUMMARY

One object of the invention is to provide a system of geographical location of an electrical signal transmitter located on the Earth's surface, which is independent of the GPS system, autonomous, with increased accuracy including in the presence of satellite maneuvers, flexible, and possessing an extended interferometry, i.e. in which the antenna-base varies from a few meters to a few tens of kilometers.

According to one aspect of the invention, a system of geographical location of at least one radio signal transmitter located on the Earth's surface is provided, including:
- a set of satellites equipped with receiving antennas adapted for receiving said signals, forming a main extended interferometry device;
- an intersatellite relative metrology device for determining the relative positions of said satellites to one another, including at least one dedicated sensor for each satellite, and intersatellite communication means;
- a device for dating said received signals from said determining of the relative positions of said satellites to one another, issued by said intersatellite relative metrology device;
- a secondary interferometry device including at least one set of at least three antennas of a satellite;
- a ground base station;
- a device for transmitting measurements acquired on the satellites to the ground base station; and
- means of determining an absolute position of at least one of the satellites.

Such a system can be used to access autonomous detection substantially in real time according to the computing capacities on board the satellites, and an improved accuracy of location when the signal is harmonic and/or whose analysis may benefit from an extended antenna-base, provided in this case by the main interferometry device.

The present invention is particularly useful in the field of observation in the radio frequency or RF passive band, for the identification of terrestrial transmitters, e.g. a rescue beacon type detection.

In addition, the combined use of a secondary interferometry device and an inter-satellite metrology device for determining the relative positions of said satellites to one another, located on a given satellite, can be used to remove the ambiguity of carrier phase cycles before extending the location accuracy via the extended antenna-base of the main interferometry device.

The inter-satellite metrology device may include a Formation Flying Radio Frequency or FFRF device, possibly supplemented by an optical metrology device. The use of data from intersatellite metrology removes the dependency on a satellite positioning system such as the GPS system, and enables the relative positioning of satellites to be accessed with increased accuracy. It also allows a precise synchronization of terrestrial signal measurements, which can be exchanged via the communication link (e.g. of the FFRF device), opening the possibility of autonomous onboard data processing and thus the location of terrestrial transmitters in real time.

The use of inter-satellite metrology also enables autonomous control of satellite formation and provides significant flexibility in terms of configuration (possible redundancy of the link with the ground, reconfiguration of the role and position of satellites, etc.).

The use of inter-satellite metrology also allows the possibility of adapting the system to any type of orbit (LEO, MEO, GEO, HEO, IGSO).

In one embodiment, said means of determining the absolute position of at least one of the satellites include at least one ground transmitter of known location.

As a variant, said means of determining the absolute position of at least one of the satellites include a receiver of a satellite positioning system, such as GPS, GALILEO or DORIS.

According to one embodiment, the device for transmitting measurements acquired on the satellites to the ground base station includes a set of at least one antenna distributed on said satellites so that a satellite includes one of them at most.

In one embodiment, the set of satellites includes a main satellite and at least one secondary satellite, said main satellite including said transmission device including a single antenna, and being adapted for collecting the set of said received signals, said relative positions and said datings transmitted by said set of satellites, and transmitting them to said ground base station.

This embodiment simplifies the transmission of data to the ground, by giving a preferential role to one of the satellites, which can then also be responsible for handling the processing or preprocessing of the measurements beforehand. In doing so, the architecture of the other satellites can be simplified.

According to one embodiment, the system includes means of determining a geographical location of said transmitter arranged in said main satellite.

For example, the secondary interferometry device is adapted for providing an approximate geographical location of said transmitter that can act as initialization for a precise geographical location of said transmitter by the main extended interferometry device.

In fact, when the measurements are processed on board the satellites, the secondary interferometry device may be used for determining the geographical location of the transmitter with rough accuracy or for initializing the precise geographical location of the transmitter by the main interferometry device. The antenna-base concerned is the distance separating the dedicated antennas within the satellite concerned.

The main interferometry device can then be used for a geographical location of the transmitter with increased accuracy and the antenna-base concerned is the distance separating the satellites, known thanks to the intersatellite metrology device. This embodiment is enabled thanks to the precise synchronization and exchange of measurements between satellites, which can be used to calculate an angular position from the knowledge of the antenna-base, on synchronized measurements of the signal path difference.

According to another embodiment, the system includes means of determining a geographical location of said transmitter arranged in said ground station.

Thus, off-line processing of the different measurements, may be introduced, according to the techniques of the art of signal processing, providing a flexibility of analysis of said signals enabling a more exhaustive location of the set of measured signals.

In one embodiment, at least one of said satellites includes a micropropulsion device.

Thus, it is possible to accurately modify on command, the relative distances of the satellite antennas during measurement, and to overcome measurement bias.

For example, said receiving antennas are adapted for receiving RF (radio frequency) electrical signals.

Thus, it is potentially possible to locate any type of terrestrial transmitter of radiofrequency signals compatible with the accuracy of determination of the measuring antenna-base.

In one embodiment, said intersatellite relative metrology device includes a Formation Flying Radio Frequency device and possibly an optical metrology device.

According to another aspect of the invention, a method is also provided of geographical location of at least one radio signal transmitter located on the Earth's surface, in which relative positions and a relative synchronization between satellites are determined by intersatellite metrology, and said received signals from said determining of the relative positions of said satellites to one another are dated.

BRIEF DESCRIPTION OF THE DRAWINGS

The invention will be better understood from the study of some embodiments described by way of non-restrictive examples and illustrated in the accompanying drawings in which.

On all the figures, elements having the same references are similar.

DETAILED DESCRIPTION

Figure 1:
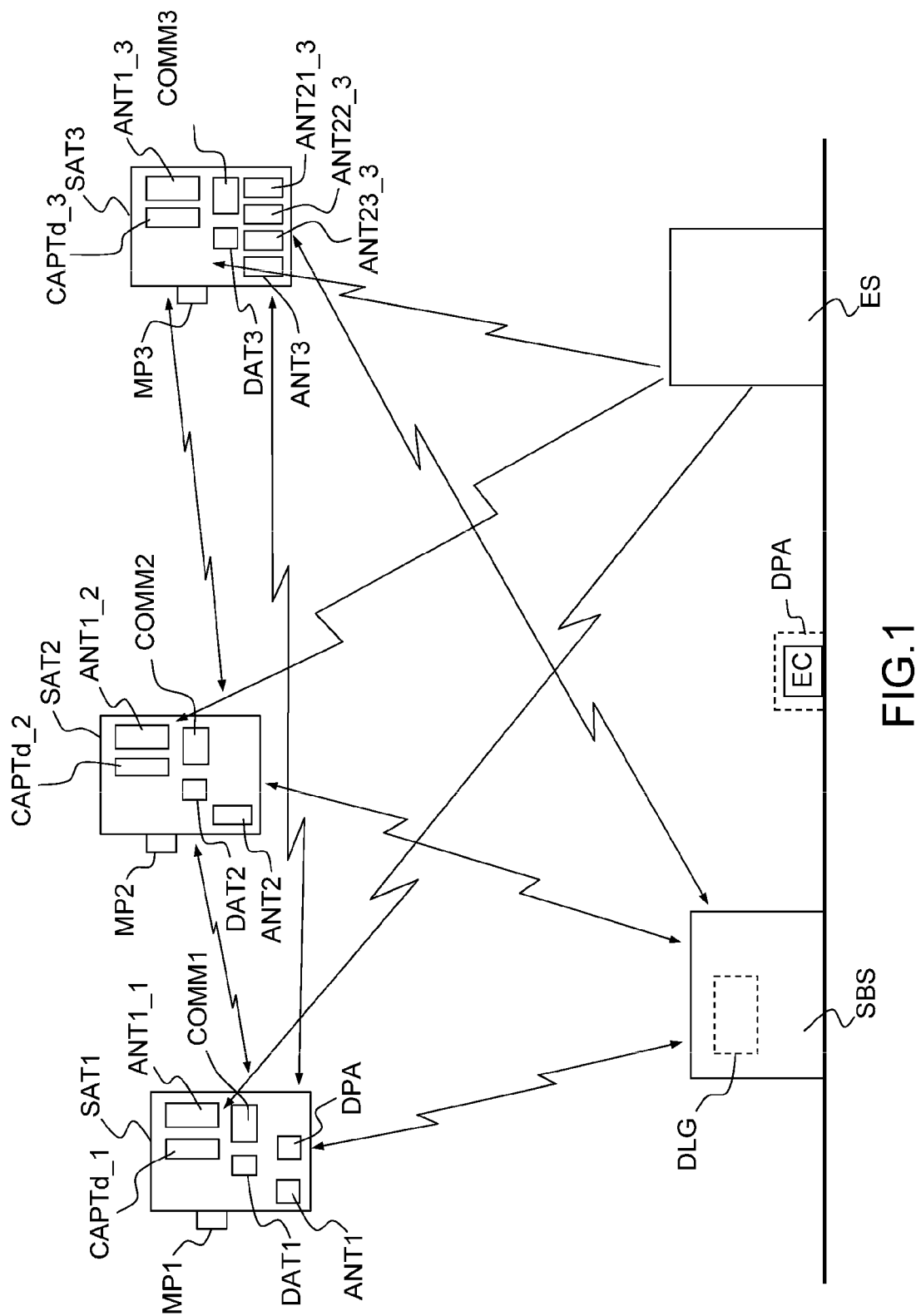
FIG. 1 schematically illustrates a system of geographical location of an electrical signal transmitter according to one aspect of the invention.

FIG. 1 schematically represents a system of geographical location of at least one radio signal transmitter ES located on the Earth's surface, including a set of satellites, for example three satellites SAT1, SAT2 and SAT3 each respectively equipped with receiving antennas ANT1, ANT2, and ANT3 adapted for receiving the signals transmitted by the transmitter ES. As a variant, the geographical location system may include any number of satellites, greater than or equal to two.

The system includes a main extended interferometry device including at least one antenna ANT1_1, ANT1_2, ANT1_3, for each satellite SAT1, SAT2, SAT3.

The system also includes an intersatellite relative metrology device for determining the relative positions of said satellites SAT1, SAT2 and SAT3 to one another, including at least one dedicated sensor, in this case a dedicated sensor CAPTd_1, CAPTd_2 and CAPTd_3 for each satellite SAT1, SAT2 and SAT3, and inter satellite communication modules COMM1, COMM2 and COMM3.

The system further includes a device for dating DAT1, DAT2 and DAT3 the received signals, based on the determining of the relative positions of the satellites SAT1, SAT2 and SAT3 to one another, issued by said intersatellite relative metrology device. The dating device of the exemplary embodiment in FIG. 1 includes three dating modules DAT1, DAT2 and DAT3 respectively fitted on satellites SAT1, SAT2 and SAT3. Thus, the dating of the measurements can be synchronized between the satellites by the intersatellite relative metrology device.

The dating device DAT1, DAT2 and DAT3 uses measurements of pseudo-distances of the different signals transmitted by the satellites SAT1, SAT2 and SAT3 of the formation. The RPN code correlation technique is used for identifying the time biases between transmitters and receivers. The precise dating then uses a technique of transferring data (measurements of pseudo-distances) and time for synchronizing the clocks of the satellites SAT1, SAT2 and SAT3 with one another. This reference time can then be used to date, in the same reference framework, the measurements of the ground radio transmitters, picked up by satellites SAT1, SAT2 and SAT3.

The system also includes a secondary interferometry device including at least one set of at least three antennas ANT21_3, ANT22_3, ANT23_3 of a satellite, in this case the third satellite SAT3, a ground base station SBS, and a module for determining the absolute position DPA of at least one of the satellites, in this case the first satellite SAT1. A preferred satellite, in this case the third satellite SAT3, supplies the reference time, via the secondary interferometry device.

The module for determining the absolute position DPA of the first satellite SAT1 includes, as illustrated in this example at least one ground transmitter EC of known location.

As a variant, the module for determining the absolute position DPA of at least one of the satellites may include a receiver of a satellite positioning system.

This module for determining a geographical location DPA, may, for example, implement pseudo-distance and/or Doppler measurements made from telecommunication signal links between the ground base station or stations SBS and the satellite.

At least one of the satellites SAT1, SAT2 and SAT3 includes a micropropulsion device, in this case, in the embodiment of FIG. 1, each of the satellites SAT1, SAT2 and SAT3 includes a micropropulsion module MP1, MP2, and MP3.

The ground base station SBS includes a module for determining a geographical location DLG. The ground location technique is carried out with the return to ground of the different, dated, measurements, made by the different satellites.

As a variant, the module for determining a geographical location DLG may be installed on board a satellite.

Furthermore, the dating modules DAT1, DAT2, DAT3, may, for example, be achieved by implementing the teaching of European patent EP 1 813 957 B1, and thus does not depend on the use of GPS receivers.

Thus, the dating module DAT1, DAT2, DAT3 of a satellite takes advantage of the relative metrology device. This may implement a method for two-way intersatellite pseudo-distance measurements, from which it extracts the intersatellite time bias, enabling the relative dating of the main interferometer measurements with precision. The metrology device can also estimate the directions of transmission of signals transmitted by other satellites.

The location accuracy of such a system is improved compared with known systems implementing GPS type receivers, since the relative positioning accuracy of the satellites may be reduced to below a centimeter, and the time synchronization is less than three nanoseconds in real time, even when satellites are being maneuvered.

Figure 2:
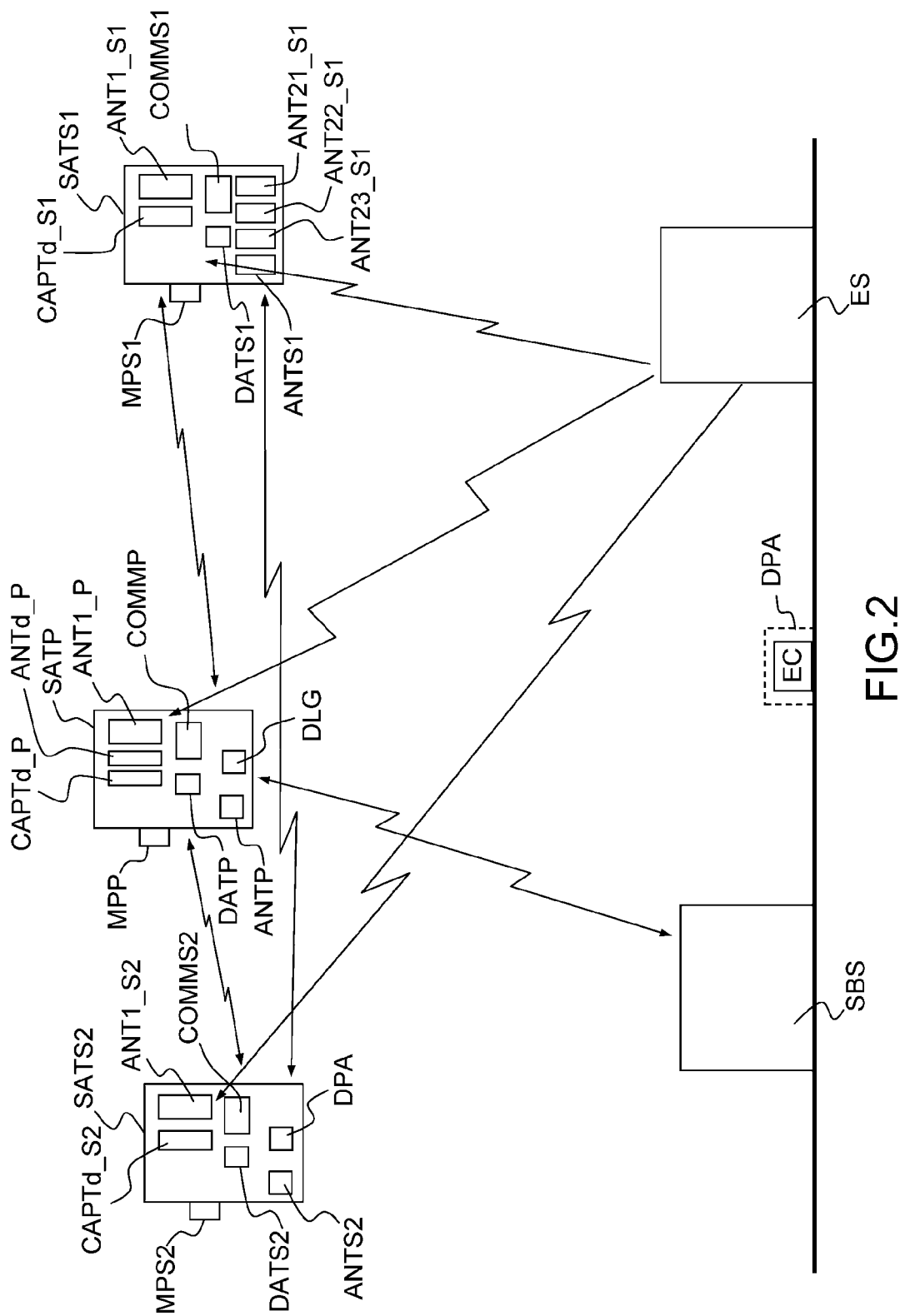
FIG. 2 schematically illustrates a system of geographical location of an electrical signal transmitter according to another aspect of the invention.

FIG. 2 schematically illustrates another embodiment of a system of geographical location, in which the set of satellites SATP, SATS1 and SATS2, always three in number, in a non-restrictive way, includes a main satellite SATP and at least one secondary satellite, in this case two secondary satellites, SATS1 and SATS2. The main satellite SATP is adapted for collecting the set of received signals, the relative positions and datings transmitted by the set of satellites SATP, SATS1, SATS2, and transmitting them to the ground base station SBS. Data processing can be performed on board the main satellite SATP or in the ground base station SBS, notably detection, tracking and a first level geolocation. Also, a module for determining the geographical location DLG of the transmitter ES can be arranged in the main satellite SATP.

As a variant, the module for determining the geographical location DLG of the transmitter ES can be arranged in the ground base station SBS.

The three main satellites SATP, and secondary satellites SATS1 and SATS2 are respectively equipped with receiving antennas ANTP, ANTS1 and ANTS2 and adapted for receiving the signals transmitted by the transmitter ES. As a variant, the geographical location system may include any number of satellites, greater than or equal to two.

The system includes a main interferometry device including at least one antenna ANT1_P, ANT1_S1, ANT1_S2, for each satellite SATP, SATS1, SATS2.

The system also includes an intersatellite relative metrology device for determining the relative positions of the satellites SATP, SATS1, and SATS2 to one another, including at least one dedicated sensor CAPTd_P, CAPTd_S1, CAPTd_S2, for each satellite SATP, SATS1, SATS2, and intersatellite communication modules COMMP, COMMS1, COMMS2.

The system further includes a device for dating DATP, DATS1, DATS2 the received signals from the determining of the relative positions of the satellites SATP, SATS1, SATS2 to one another, issued by said intersatellite relative metrology device, in this case the device FFRF. The dating device of the exemplary embodiment in FIG. 2 includes three dating modules DATP, DATS1 and DATS2 respectively fitted on satellites SATP, SATS1 and SATS2. Thus, the dating of the measurements can be synchronized between the satellites.

The system also includes a secondary interferometry device including at least one set of at least three antennas ANT21_S1, ANT22_S1, ANT23_S1 of a satellite, in this case the secondary satellite SATS1, a ground base station SBS, and a module for determining the absolute position DPA of at least one of the satellites, in this case the secondary satellite SATS2. A preferred satellite, in this case the secondary satellite SATS2, supplies the reference time, via the secondary interferometry device.

The module for determining the absolute position DPA of the first satellite SAT1 includes, as illustrated in this example at least one ground transmitter EC of known location.

As a variant, the module for determining the absolute position DPA of at least one of the satellites may include a receiver of a satellite positioning system.

The module for determining a geographical location DLG may be installed on board a satellite, in this case the main satellite SATP.

As a variant, the ground base station SBS may include a module for determining a geographical location DLG.

The dating device of the exemplary embodiment in FIG. 2 includes three dating modules DATP, DATS1 and DATS2 respectively fitted on the main SATP and secondary satellites SATS1 and SATS2.

As a variant, a single dating module could be arranged in the ground base station SBS, replacing the three dating modules DATP, DATS1 and DATS2.

At least one of the main SATP, and secondary satellites SATS1 and SATS2 includes a micropropulsion device, in this case, in the embodiment of FIG. 2, each of the main SATP and secondary satellites SATS1 and SATS2 includes a micropropulsion module MPP, MPS1 and MPS2.

The invention claimed is:

1. A system for determining a geographical location, the system comprising:
    at least one radio signal transmitter located on the Earth's surface;
    a set of satellites comprising receiving antennas configured to receive signals from the at least one radio signal transmitter located on the Earth's surface, the receiving antennas forming a main extended interferometry device;
    an intersatellite relative metrology device configured to determine relative positions of said satellites to one another, the intersatellite relative metrology device comprising at least one dedicated sensor within each satellite, and comprising an intersatellite communicator;
    a dating device configured to receive the relative positions of said satellites to one another from said intersatellite relative metrology device;
    a secondary interferometry device comprising at least one set of at least three antennas within a satellite of the set of satellites, the secondary interferometry device being configured to supply a reference time;
    a ground base station on the Earth's surface;
    a transmission device configured to transmit measurements acquired at the set of satellites to the ground base station; and means for determining an absolute position of at least one satellite of the set of satellites.

2. The system according to claim 1, wherein said means for determining the absolute position of the at least one satellite of the set of satellites is within at least one ground transmitter located at a known location.

3. The system according to claim 1, wherein said means for determining the absolute position of the at least one satellite of the set of satellites is within a receiver of a satellite positioning system.

4. The system according to claim 1, wherein the device configured to transmit measurements acquired at the set of satellites to the ground base station comprises at least one antenna distributed within said set of satellites, such that each satellite includes at most one antenna.

5. The system according to claim 1, wherein the set of satellites comprises a main satellite and at least one secondary satellite, said main satellite comprising said transmission device comprising a single antenna, and being configured to collect said received signals, said relative positions and said datings transmitted by said set of satellites, and being configured to transmit said received signals, said relative positions and said datings to said ground base station.

6. The system according to claim 5, further comprising means for determining a geographical location of said transmission device within said main satellite.

7. The system according to claim 6, wherein the secondary interferometry device is configured to provide an approximate geographical location of said transmission device for initialization of a precise geographical location of said transmission device by the main extended interferometry device.

8. The system according to claim 1, further comprising means for determining a geographical location of said transmission device within said ground base station.

9. The system according to claim 1, wherein at least one satellite of said set of satellites comprises a micropropulsion device.

10. The system according to claim 1, wherein said receiving antennas are configured to receive RF signals.

11. The system according to claim 1, wherein said intersatellite relative metrology device comprises a Formation Flying Radio Frequency device.

12. The system according to claim 11, wherein said intersatellite relative metrology device comprises an optical metrology device.

* * * * *